United States Patent
Huang

(10) Patent No.: US 10,073,586 B2
(45) Date of Patent: Sep. 11, 2018

(54) METHOD AND SYSTEM FOR MOUSE POINTER TO AUTOMATICALLY FOLLOW CURSOR

(71) Applicant: Alibaba Group Holding Limited, George Town, Grand Cayman (KY)

(72) Inventor: Jing Huang, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 299 days.

(21) Appl. No.: 14/936,413

(22) Filed: Nov. 9, 2015

(65) Prior Publication Data
US 2016/0139767 A1    May 19, 2016

(30) Foreign Application Priority Data
Nov. 19, 2014 (CN) .......................... 2014 1 0662950

(51) Int. Cl.
*G06F 3/048* (2013.01)
*G06F 3/0481* (2013.01)
*G06F 3/0484* (2013.01)

(52) U.S. Cl.
CPC ...... *G06F 3/04812* (2013.01); *G06F 3/04842* (2013.01); *G06F 2203/04801* (2013.01)

(58) Field of Classification Search
CPC .................. G06F 2203/04801; G06F 3/0481
See application file for complete search history.

(56) References Cited

U.S. PATENT DOCUMENTS

| 6,489,981 B1 * | 12/2002 | Jones ...................... G06F 3/038 715/858 |
| 6,727,929 B1 | 4/2004 | Bates et al. |
| 7,447,995 B2 | 11/2008 | Luciani, Jr. et al. |
| 7,904,835 B1 * | 3/2011 | Dhawan .............. G06F 3/04812 715/756 |
| 2005/0035976 A1 | 2/2005 | Ecob et al. |
| 2005/0233287 A1 * | 10/2005 | Bulatov ............... G09B 21/006 434/114 |
| 2006/0143571 A1 * | 6/2006 | Chan ................... G06F 3/03543 715/764 |
| 2007/0294644 A1 | 12/2007 | Yost |
| 2012/0206350 A1 | 8/2012 | Figaro et al. |
| 2014/0092018 A1 | 4/2014 | Geithner |

* cited by examiner

*Primary Examiner* — William Bashore
*Assistant Examiner* — Rayeez Chowdhury
(74) *Attorney, Agent, or Firm* — Shun Yao; Park, Vaughan, Fleming & Dowler LLP

(57) ABSTRACT

Embodiments of the present application disclose a method for controlling a mouse pointer to automatically follow a cursor. During operation, the system detects whether the cursor is in a currently active window displayed on a screen of a computing device. In response to detecting that the cursor is in the currently active window, the system obtains coordinates of the cursor. The system then calculates follow coordinates according to the coordinates of the cursor and a predetermined distance value. The system subsequently sets coordinates of the mouse pointer to the follow coordinates.

23 Claims, 7 Drawing Sheets

METHOD AND SYSTEM FOR MOUSE POINTER TO AUTOMATICALLY FOLLOW CURSOR

RELATED APPLICATION

Under 35 U.S.C. 119, this application claims the benefit and right of priority of Chinese Patent Application No. 201410662950.0, filed 19 Nov. 2014.

BACKGROUND

Field

The present invention relates to user interfaces, and particularly relates to a method and system for a mouse pointer to automatically follow a cursor.

Related Art

A typical graphical user interface implemented on a computer usually makes both a mouse pointer and a cursor available to a computer user. The user can use the mouse to change the coordinates of the mouse pointer on the computer screen, in order to select items on the computer screen or position the cursor. The cursor is an indicator displayed on the graphical user interface. The cursor indicates the location of input characters when the user inputs text into a text input box or an editing region of a program, and is typically a vertical blinking line. Generally, one can use the mouse to position the cursor in the text input box or the editing region of the program. The user can move the mouse pointer to a desired location, and then click the mouse key or tap a touch panel. The cursor then appears at the desired location. The cursor may automatically move with text input or respond to the use of cursor keys on the keyboard. Therefore, the user may use different input devices to control the cursor and the mouse pointer when inputting text. The coordinates of the cursor may be independent of the coordinates of the mouse pointer, and the mouse pointer may remain at the coordinates where the last operation was performed.

During text input the user may accidentally input text at the position of the mouse pointer, rather than at the position of the cursor. In some scenarios, the coordinates where the user performed the last input operation may be located in a first text input box and the mouse pointer may be located in a second text input box. The user may misoperate the mouse key or touch panel and relocate the cursor to the second text input box and away from the original text input location.

For example, when the user is inputting text into a Word document or into a dialogue box while chatting with an instant messaging tool, the mouse pointer may be positioned over a search input box of the instant messaging tool. The user may misoperate the mouse key or touch panel, resulting in the user incorrectly inputting text into the wrong text input box. The user may accidentally input text into the search input box rather than the dialogue box or the Word document. Consequently, the user experience is poor. The user needs to reposition the cursor to the original text input box or editing region in order to continue inputting text. Unfortunately, relocating the cursor can be inconvenient and time-consuming, especially if the text is relatively long and the original input coordinates are in the middle of the text.

SUMMARY

One embodiment of the present invention provides a system for controlling a mouse pointer to automatically follow a cursor. During operation, the system detects whether the cursor is in a currently active window displayed on a screen of a computing device. In response to detecting that the cursor is in the currently active window, the system obtains coordinates of the cursor. The system then calculates follow coordinates according to the coordinates of the cursor and a predetermined distance value. The system subsequently sets coordinates of a mouse pointer to the follow coordinates.

In a variation of this embodiment, calculating follow coordinates further includes determining a width of a character in an editing region where the cursor is located when cursor is in the currently active window, and setting the predetermined distance to be the width of the character.

In a variation of this embodiment, calculating follow coordinates further includes determining a circle that is centered on the cursor coordinates, and setting the follow coordinates to be a point on the circle.

In a variation on this embodiment, calculating the follow coordinates further includes determining an angle formed between a y-axis coordinate of the cursor and a (e.g., hypothetical) line connecting the cursor with a follow position of the mouse pointer. The system also calculates the follow coordinates based on the coordinates of the cursor, the angle, and the predetermined distance value.

In a variation on this embodiment, in response to detecting movement of the cursor, the system continually updates coordinates of the mouse pointer to follow the cursor at a distance equal to the predetermined distance value.

In a variation on this embodiment, the system displays a configuration option to allow the user to enable the mouse pointer to follow the cursor; and the system receives user input to enable the configuration option.

In a variation of this embodiment, the system maintains the mouse pointer to the left of the cursor until the system receives user input to stop following the cursor.

Another embodiment of the present invention provides a system for controlling a mouse pointer displayed on a screen of a device. During operation, the system detects the cursor in a currently active window displayed on the screen of the device. The system obtains coordinates of the cursor and resets coordinates of the mouse pointer to a predetermined position in the currently active window.

In a variation of this embodiment, the predetermined position has coordinates.

In a variation of this embodiment, resetting coordinates of the mouse pointer includes setting the coordinates of the mouse pointer to follow the coordinates of the cursor.

BRIEF DESCRIPTION OF THE DRAWINGS

The accompanying drawings described herein are used for further understanding the present application and constitute a part of the present application, and the schematic embodiments of the present application and the descriptions thereof are used for interpreting the present application, rather than improperly limiting the present application. In which.

DETAILED DESCRIPTION OF EMBODIMENTS

Embodiments of the present invention solve the problem of inadvertent user input at an incorrect screen location by allowing a mouse pointer to automatically follow a cursor position. In some scenarios, when a user is attempting to input information in a dialogue box, a document (e.g., a Microsoft Word document), or some other text input region, the user may accidentally click a mouse key or touch a touch panel while the mouse pointer is at a different screen location. The cursor may then relocate to the position of the mouse pointer, and the user's input is unintentionally entered at the new location of the cursor. As a result, the user suffers from a poor user experience. By providing an option to the user in which the mouse pointer automatically follows the cursor position, an automatic follow system can avoid unintentionally relocating the cursor when the user accidentally clicks a mouse key or touches a touch panel. The position of the cursor does not change, and the user can then input text at the correct input location.

Figure 1:
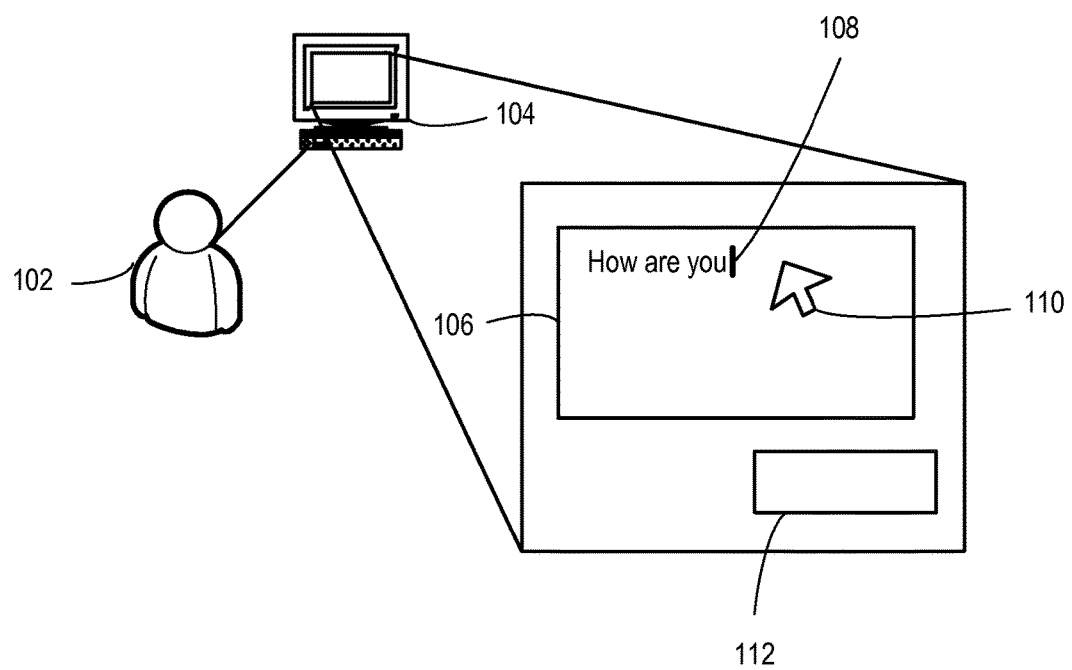
FIG. 1 presents a diagram illustrating an exemplary computing environment in which a mouse pointer may automatically follow a cursor, in accordance with an embodiment of the present invention.

FIG. 1 presents a diagram illustrating an exemplary computing environment in which a mouse pointer may automatically follow a cursor, in accordance with an embodiment of the present invention. As illustrated in FIG. 1, a user 102 may be operating a computer 104. User 102 may be attempting to input text into a first input box 106. A cursor 108 located in first input box 106 indicates a location for inputting text. A mouse pointer 110 is located to the right of cursor 108 and above a search input box 112. User 102 may inadvertently touch a touch panel or click a mouse key. With standard computing systems, if mouse pointer 110 is located at search input box 112, the user input will be entered incorrectly into search input box 112. With embodiments of the present invention, as depicted in FIG. 1, mouse pointer 110 automatically follows cursor 108 at a predetermined distance, and the user may correctly enter the user input into first input box 106, thereby improving the function of the computer. This reduces the number of user operation errors and results in a more efficient computing environment.

In some embodiments, an automatic follow system may override the computer's operating system and interact directly with the mouse hardware to control the movement of the mouse pointer. The system can control the mouse pointer to follow the cursor even as the mouse hardware does not move. The system may also intercept signals from the mouse and/or control the mouse pointer coordinates.

In some embodiments, a local computer system sends a request to a remote memory location of a remote server to transfer instructions and/or data from the remote server. The local computer system may download (e.g., automatically or otherwise) from the remote server the most up-to-date instructions to intercept mouse signals, interface with mouse hardware, and control a mouse pointer on the local computer. The remote server may generate and/or customize the instructions for the local computer system to download. Some systems may optionally (e.g., with user authorization) send information regarding the operation of the automatic follow system to a remote server.

In some embodiments, the system may allocate memory to store instructions for interfacing with the mouse hardware and controlling the mouse pointer. The system may then transfer control of the mouse pointer and mouse hardware interface to the instructions in the allocated memory.

Overview of Mouse Pointer Automatically Following a Cursor

Figure 2:
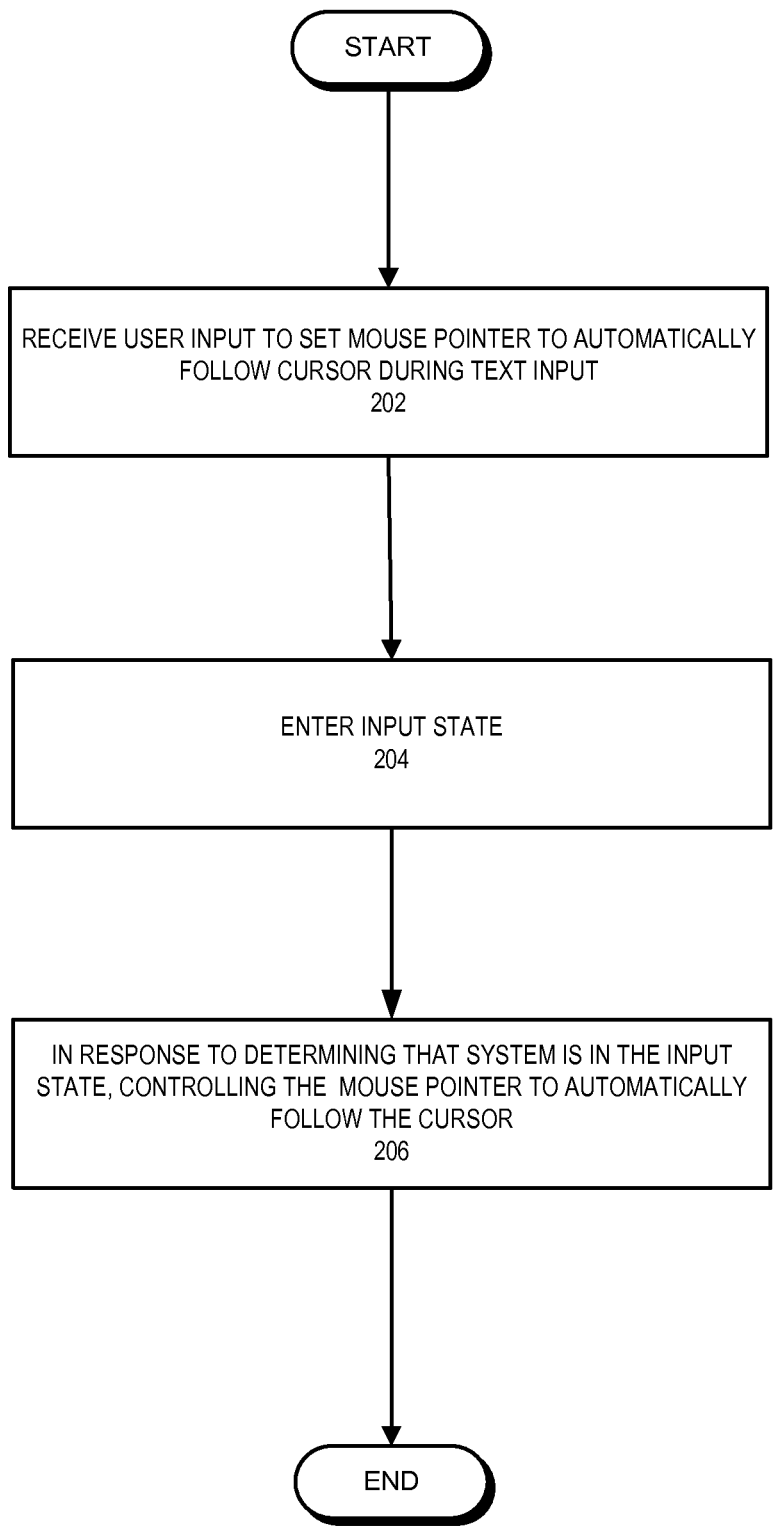
FIG. 2 presents a flowchart illustrating an overview of an exemplary process for a mouse pointer to automatically follow a cursor, in accordance with an embodiment of the present invention.

FIG. 2 presents a flowchart illustrating an overview of an exemplary process for a mouse pointer to automatically follow a cursor, in accordance with an embodiment of the present invention. As illustrated in FIG. 2, the system initially receives input to set the mouse pointer to automatically follow the cursor during text input (operation 202). The system may provide a configuration option (e.g., "the mouse pointer automatically follows the cursor in the input state") for the user to select, and the user may configure and/or select the configuration option.

Next, the system enters an input state (operation 204). For example, the system may open a dialog box of an instant messaging tool to enter the input state in response to user input.

In response to determining that the system is in the input state, the system may control the mouse pointer to automatically follow the cursor (operation 206). If the user accidentally touches the touch panel or presses the mouse key, the position of the cursor will not change. Thus, the input position will remain at the correct location.

Subsequently, the system may end the input state, and the user may use the touch panel or the mouse to move the mouse pointer manually to another interface location. The system may exit the state in which the mouse pointer automatically follows the cursor. In some embodiments, the user may press a particular key combination, move the mouse in a predetermined pattern, or input some combination of keys and mouse movements, or trace a particular pattern on the touch panel, to exit the state in which the mouse pointer automatically follows cursor.

Exemplary Process for Mouse Pointer to Automatically Follow a Cursor

Figure 3:
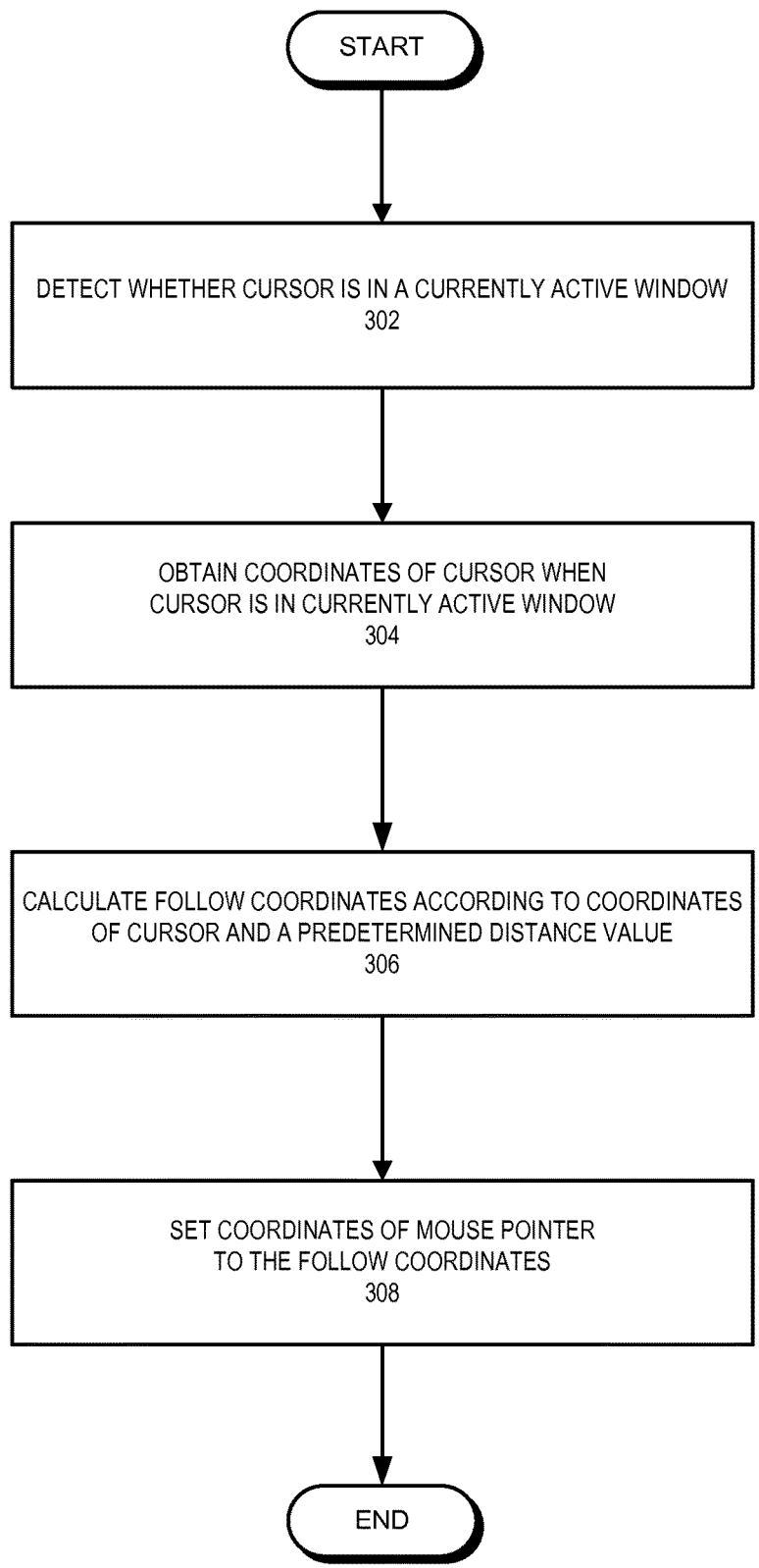
FIG. 3 presents a flowchart illustrating an exemplary process for a mouse pointer to automatically follow a cursor, in accordance with an embodiment of the present application.

FIG. 3 presents a flowchart illustrating an exemplary process for a mouse pointer to automatically follow a cursor, in accordance with an embodiment of the present invention. During operation, the system may initially detect whether the cursor is in a currently active window (operation 302). The system may then obtain the coordinates of the cursor if the cursor is in the currently active window (operation 304). The system may then calculate follow coordinates based on the coordinates of the cursor and a pre-determined distance value (operation 306). The predetermined distance value may be equal to the width of the character. The system may then set the coordinates of the mouse pointer to the follow coordinates (operation 308). The system may continually perform the operations of FIG. 3 in order to update the location of the mouse pointer to follow the cursor.

The system may open a window for each program executing in the operating system. The active window is a current working window. In some embodiments, although the system may open a plurality of windows, only one of the open windows is active at any time. The active window is at the uppermost layer on the desktop and is not covered by the other open windows. In some embodiments, the cursor does not appear in a window in which the user may not input text, regardless of whether the window is an active window or not.

For a window in which the user may input text, the cursor may appear in the editing region (also referred to as the working region) of a currently active window. The cursor typically does not appear in the editing region of a non-active window. For example, for a Word window or a chat dialog box of an instant messaging tool, the cursor may only appear in the editing region (e.g., working region) of the currently active window. As another example, if there is a plurality of open Word windows, the cursor may only appear in a Word window that is currently in an active state.

The system can detect whether the cursor is in the currently active window by obtaining the cursor state information provided by the operating system. If the cursor is not in the currently active window, the system may skip the subsequent operations 304-308. If the cursor is in the currently active window, this indicates that the current window is a text input window, and the cursor may automatically appear in the editing region of the currently active window. In addition, the user may input text into the editing region. That is, the user may be inputting or is about to input text to the region.

The system may then calculate the follow coordinates of the mouse pointer, which includes determining the cursor coordinates. The system may determine the coordinates of the cursor in the currently active window. The system may obtain the coordinates of the cursor from the operating system. After obtaining the coordinates of the cursor, the system may determine the follow coordinates of the mouse pointer.

The system may calculate the follow coordinates based on the coordinates of the cursor, a predetermined distance value, and the orientation (e.g., angle, bearing or relative direction) of a mouse pointer with respect to the cursor. The system may determine the predetermined distance value according to a desired spacing between the mouse pointer and the cursor.

For example, assuming that the coordinates of the cursor are (620, 510) (e.g., using the pixel as the unit). If the mouse pointer follows the right side of the cursor, at a distance of 50 pixels from the cursor, then the follow coordinates may be (670, 510). If the mouse pointer follows at the top of the cursor at a distance of 80 pixels from the cursor, then the follow coordinates may be (620, 590).

Alternatively, the system may calculate the follow coordinates by using the coordinates of the cursor as a center of a circle and using the predetermined distance value as a radius. After the system determines a circle centered on the coordinates of the cursor, the system may use any point on the circle as the follow coordinates.

As another alternative, the system may calculate the follow coordinates for the mouse pointer based on an angle formed between a y-axis coordinate of the cursor and a (e.g., hypothetical) line connecting the cursor with the mouse pointer (e.g., a hypothetical line drawn from the cursor to the proposed or target follow position of the mouse pointer). The system calculates the follow coordinates of the mouse pointer according to the coordinates of the cursor, the angle, and the predetermined distance value. When the predetermined distance value is zero, the follow coordinates are the same as the coordinates of the cursor.

After calculating the follow coordinates, the system sets the coordinates of the mouse pointer to the follow coordinates. The mouse pointer moves to the follow coordinates and follows the cursor. If the predetermined distance value is zero, the mouse pointer overlaps the position of the cursor.

The cursor may automatically move with text input, and thus the coordinates of the cursor may constantly change. The system may repeatedly perform operations 302 to 308 without interruption during text input. After the system performs operation 302, with changes in the coordinates of the cursor, the system may also repeatedly perform operations 304 to 308. The mouse pointer thereby automatically moves with the cursor.

Since the typical default direction for inputting text is from left to right, if the mouse pointer follows the cursor on the right side, there may be a visual obstruction to the user. Therefore, in one embodiment, the mouse pointer follows the left side of the cursor, and the system uses a method to calculate the follow coordinates on the left side of the cursor coordinates. For example, the system may apply a calculation method that determines the x-coordinate of the follow coordinates by subtracting the predetermined distance value from the x-coordinate of the cursor coordinates. The system may then set the y-coordinate of the follow coordinates to be equal to the y-coordinate of the cursor, such that the follow coordinates are just on the left side of the coordinates of the cursor. Alternatively, the system can calculate the follow coordinates to be on the upper left side or the lower left side of the coordinates of the cursor on the screen. In some embodiments, the system may also compute follow coordinates for a mouse pointer that follows the right side of the cursor, with the y-coordinate of the follow coordinates set to be equal to the y-coordinate of the cursor.

Another Exemplary Process for Mouse Pointer to Automatically Follow Cursor

Figure 4:
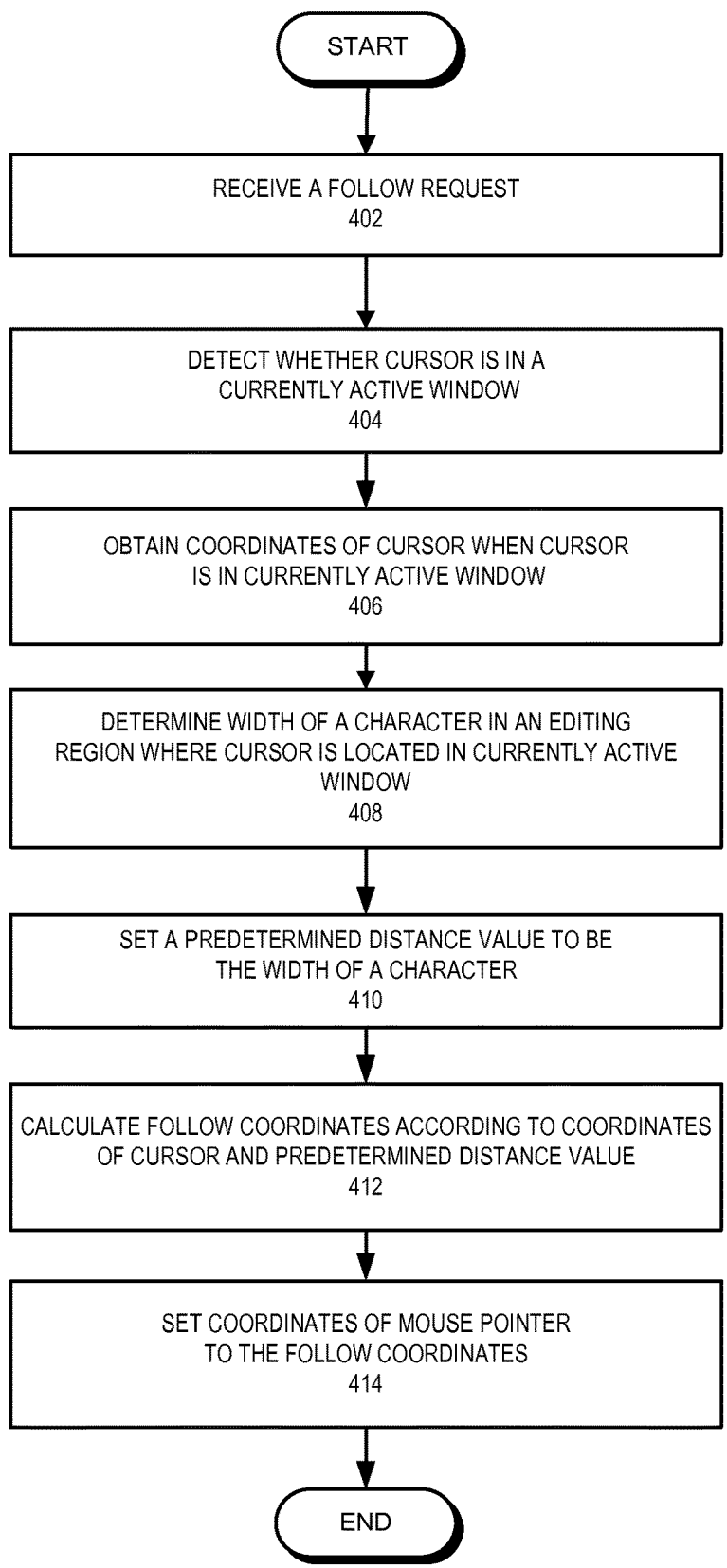
FIG. 4 presents a flowchart illustrating another exemplary process for a mouse pointer to automatically follow a cursor, in accordance with an embodiment of the present application

FIG. 4 presents a flowchart illustrating another exemplary process for a mouse pointer to automatically follow a cursor, in accordance with an embodiment of the present application. During operation, the system may initially receive a follow request (operation 402). For example, the user may click a follow button to initiate a follow request so that the mouse automatically follows the cursor.

In response to receiving the request, the system detects whether the cursor is in a currently active window (operation 404). The user may be inputting information into the currently active window. The system may obtain coordinates of the cursor when the cursor is in the currently active window (operation 406).

When the cursor is in the currently active window, the system may determine the width of a character in an editing region where the cursor is located in the currently active window (operation 408). The system may set a predetermined distance value to be equal to the width of the character (operation 410). The system may then calculate follow coordinates according to the coordinates of the cursor and the predetermined distance value (operation 412). The system may then set the coordinates of the mouse pointer to the follow coordinates (operation 414).

In some embodiments, the system may perform the operations illustrated in FIG. 4 to automatically follow the cursor after the computer is started. The mouse pointer may follow the cursor in any currently active window that allows for text input, and the process illustrated in FIG. 4 may terminate after the system (e.g., computer hardware) shuts down or the associated programs are closed.

The system may present an interface that a user may interact with to initiate a follow request. For example, the user may click a follow button on the interactive interface to initiate a follow request so that the mouse pointer automatically follows the cursor. The system may then subsequently perform operations 404-414 after receiving the follow request.

In some embodiments, the user may also initiate a disable follow request via the interactive interface. For example, the user may click a disable follow button on the interaction interface to request that the mouse pointer no longer automatically follows the cursor. As another example, the user may also move the mouse in a specific, predetermined pattern to disable following the cursor. After receiving the disable follow request, the mouse pointer stops following the cursor.

When the user misoperates the mouse key or the touch panel (e.g., unintentionally pressing on a mouse key or accidentally touching the touch panel), the system may relocate the cursor to the position where the mouse pointer is located due to the misoperation of the mouse key or the touch panel. The user may then need to relocate the cursor to the original input position. This is the case even if the cursor does not move out of the currently active window.

If the follow coordinates are far away from the cursor coordinates, it is inconvenient for the user to relocate the cursor. In one embodiment, when the cursor is in the currently active window, the system obtains the width of the character in the editing region where the cursor is located in operation 408. In operation 410, the system sets the predetermined distance value to be the width of the character, such that the distance between the mouse pointer and the cursor is the width of a character. In this way, it is convenient for the user to quickly relocate the cursor to the original input position in case of the user's misoperation of the mouse key and/or touch panel. The system may determine the width of a character in the editing region where the cursor is located by obtaining an attribute value of a character from the editing region in the currently active window.

In some embodiments, the system may perform operations 408 and 410 prior to performing operation 406. That is, the system may determine the width of a character in the editing region where the cursor is located, in the currently active window. The system may then determine the coordinates of the cursor after setting the predetermined distance value to be the width of the character.

Exemplary Apparatus

Figure 5:
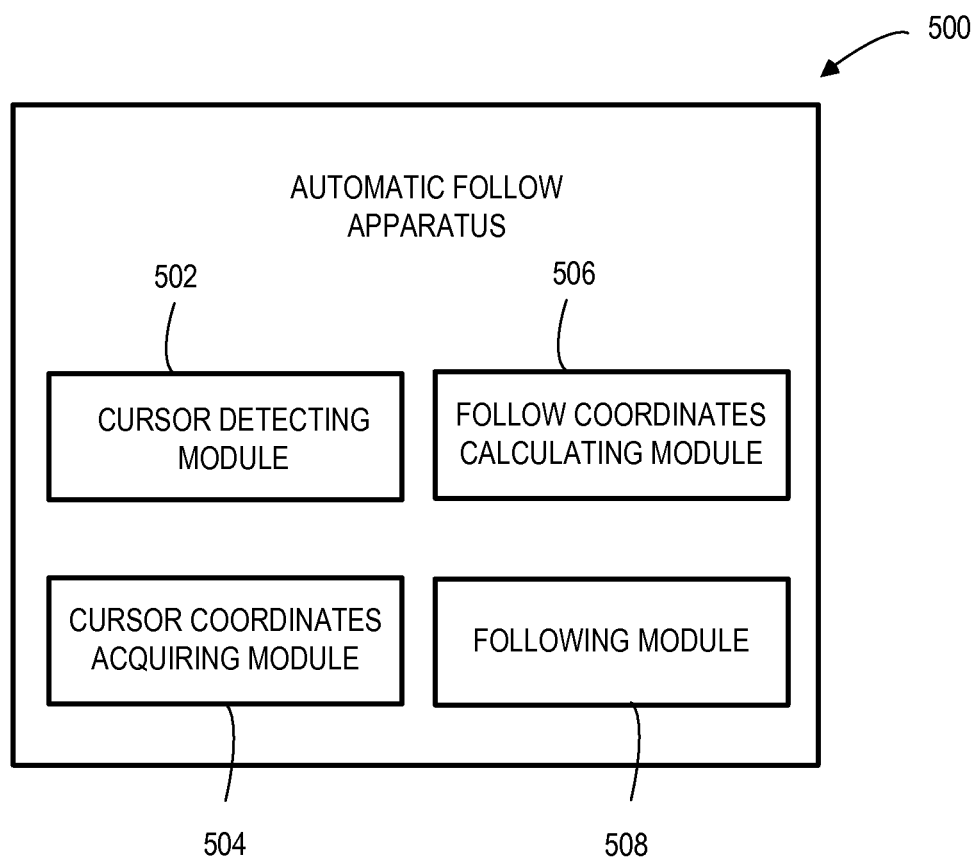
FIG. 5 presents a block diagram illustrating an exemplary automatic follow apparatus in which the mouse pointer automatically follows a cursor, in accordance with an embodiment of the present application.

FIG. 5 presents a block diagram illustrating an exemplary automatic follow apparatus in which the mouse pointer automatically follows a cursor, in accordance with an embodiment of the present application. Automatic follow apparatus 500 may be, for example, a desktop computing device. Apparatus 500 may execute the methods described herein. Apparatus 500 can comprise a plurality of modules which may communicate with one another via a wired or wireless communication channel. Apparatus 500 may be realized using one or more integrated circuits, and may include fewer or more modules than those shown in FIG. 5. Further, apparatus 500 may be integrated in a computer system, or realized as a separate device which is capable of communicating with other computer systems and/or devices.

Specifically, apparatus 500 can comprise any combination of a cursor detecting module 502, a cursor coordinates acquiring module 504, a follow coordinates calculating module 506, and a following module 508. Note that apparatus 500 may also include additional modules and data not depicted in FIG. 5, and different implementations may arrange functionality according to a different set of modules. Embodiments of the present invention are not limited to any particular arrangement of modules.

Cursor detecting module 502 may be configured to detect whether the cursor is in a currently active window. Cursor coordinates acquiring module 504 may be configured to determine (e.g., obtain from the operating system or another module) coordinates of the cursor when the cursor is in the currently active window. Follow coordinates calculating module 506 may be configured to calculate follow coordinates according to coordinates of the cursor and a predetermined distance value. In some embodiments, follow coordinates calculating module 506 generates follow coordinates that position the mouse pointer to the left of the cursor. Following module 508 may be configured to set the coordinates of the mouse pointer to the value of the follow coordinates.

Exemplary Apparatus

Figure 6:
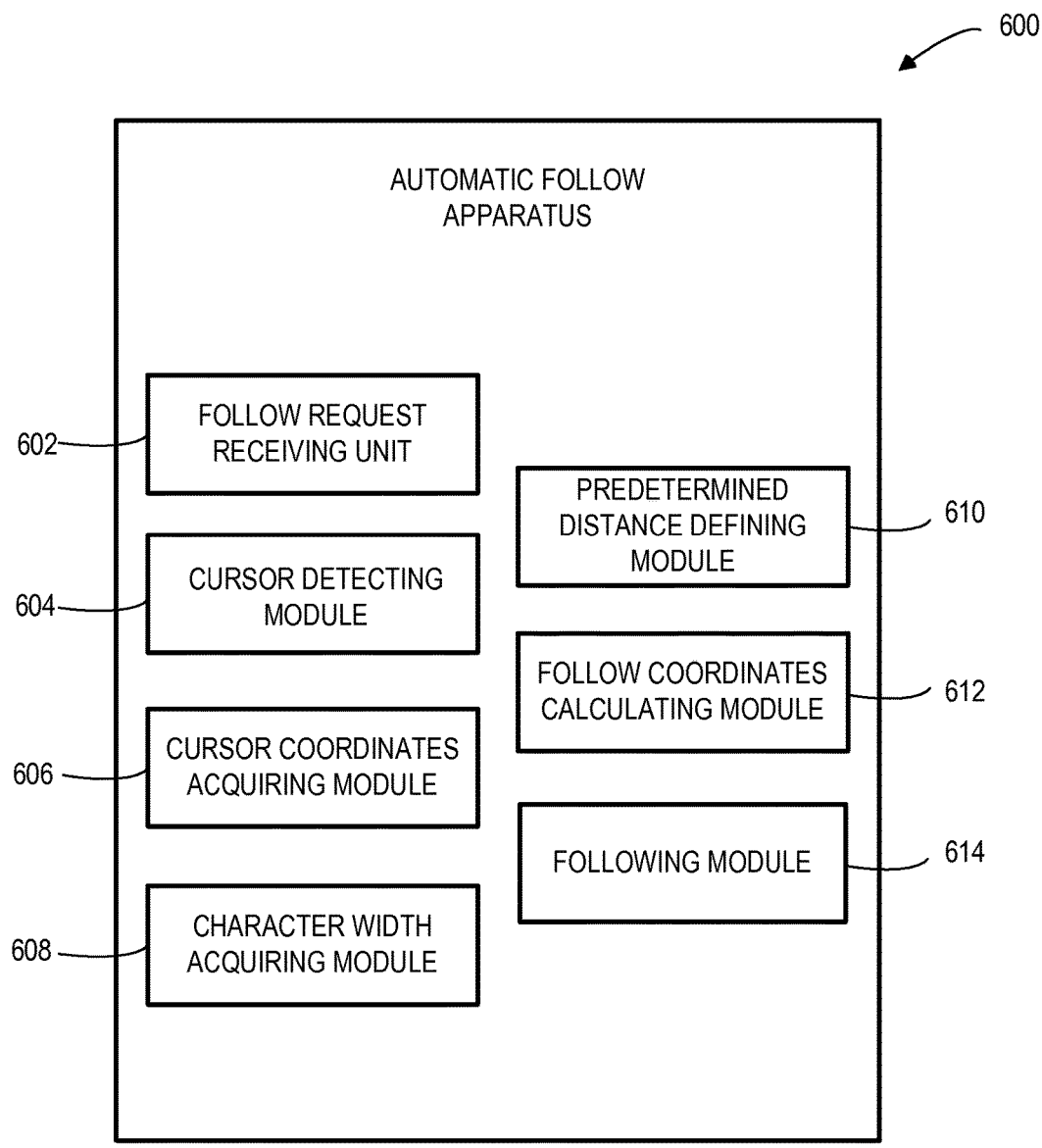
FIG. 6 presents a block diagram illustrating another exemplary automatic follow apparatus in which the mouse pointer automatically follows a cursor, in accordance with an embodiment of the present application.

FIG. 6 presents a block diagram illustrating another exemplary automatic follow apparatus in which the mouse pointer automatically follows a cursor, in accordance with an embodiment of the present application. Automatic follow apparatus 600 may be, for example, a desktop computing device. Apparatus 600 may execute the methods described herein. Apparatus 600 can comprise a plurality of modules which may communicate with one another via a wired or wireless communication channel. Apparatus 600 may be realized using one or more integrated circuits, and may include fewer or more modules than those shown in FIG. 6. Further, apparatus 600 may be integrated in a computer system, or realized as a separate device which is capable of communicating with other computer systems and/or devices.

Specifically, apparatus 600 can comprise any combination of a follow request receiving unit 602, a cursor detecting module 604, a cursor coordinates acquiring module 606, a character width acquiring module 608, a predetermined distance defining module 610, a follow coordinates calculating module 612, and a following module 614. Note that apparatus 600 may also include additional modules and data not depicted in FIG. 6, and different implementations may arrange functionality according to a different set of modules. Embodiments of the present invention are not limited to any particular arrangement of modules.

Follow request receiving unit 602 may be configured to receive a follow request. After receiving the follow request, follow request receiving unit 602 enables cursor detecting module 604. Cursor detecting module 604 may be configured to detect whether the cursor is in a currently active window. Cursor coordinates acquiring module 606 may be configured to determine (e.g., obtain from operating system or other component) coordinates of the cursor when the cursor is in the currently active window. Character width acquiring module 608 may be configured to determine the width of a character in an editing region in a currently active window where the cursor is located, when the cursor is in the currently active window. Predetermined distance defining module 610 may be configured to set a predetermined distance value to be equal to the width of the character. Follow coordinates calculating module 612 may be configured to calculate follow coordinates according to coordinates of the cursor and the predetermined distance value. Following module 614 may be configured to set the coordinates of the mouse pointer to be equal to the follow coordinates.

In some embodiments, cursor detecting module 604 is disabled by default. The system enables cursor detecting module 604 after receiving the follow request, and may also execute or enable the other modules to perform the functions described herein. Alternatively, the system disables modules 604-614 by default, and after follow request receiving unit 602 receives the follow request, the system enables modules 604-614, so that the mouse pointer follows cursor.

In some embodiments, automatic follow apparatus 600 may also include a follow disabling module. The follow disabling module may be configured to receive a disable follow request, and disables cursor detecting module 604 upon receiving the disable follow request. When the apparatus receives the disable follow request, modules 606-614 may stop execution. In some embodiments, modules 602-614 stop execution (e.g., the system disables the modules) upon receiving a request to disable following the cursor.

Exemplary Automatic Follow System

Figure 7:
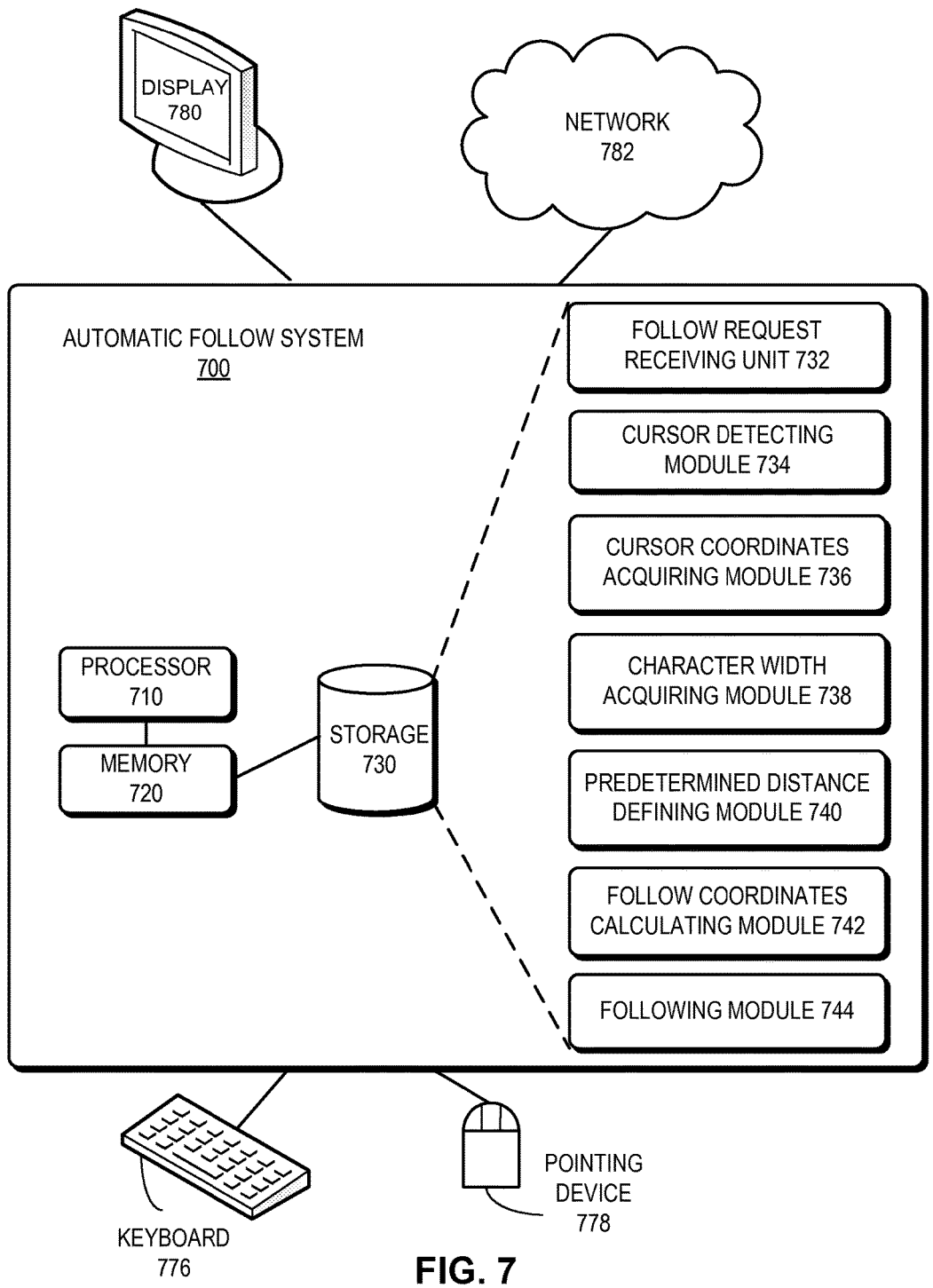
FIG. 7 presents a block diagram illustrating an exemplary automatic follow system in which a mouse pointer automatically follows a cursor, in accordance with an embodiment of the present application.

FIG. 7 presents a block diagram illustrating an exemplary automatic follow system in which a mouse pointer automatically follows a cursor, in accordance with an embodiment of the present application. Automatic follow system 700 includes a processor 710, a memory 720, and a storage device 730. Storage 730 typically stores instructions that can be loaded into memory 720 and executed by processor 710 to perform the methods described above. In one embodiment, the instructions in storage 730 can implement a follow request receiving unit 732, a cursor detecting module 734, a cursor coordinates acquiring module 736, a character width acquiring module 738, a predetermined distance defining module 740, a follow coordinates calculating module 742, and a following module 744, which can communicate with each other through various means.

In some embodiments, modules 732-744 can be partially or entirely implemented in hardware and can be part of processor 710. Further, in some embodiments, the automatic follow system may not include a separate processor and memory. Instead, in addition to performing their specific tasks, modules 732-744, either separately or in concert, may be part of special-purpose computation engines.

Storage 730 stores programs to be executed by processor 710. Specifically, storage 730 stores a program that implements a system (e.g., application) for controlling a mouse pointer to follow a cursor. During operation, the application program can be loaded from storage 730 into memory 720 and executed by processor 710. As a result, automatic follow system 700 can perform the functions described above. Automatic follow system 700 further includes a display 780, and can be coupled to a keyboard 776 and a pointing device 778 (e.g., the pointing device can be a mouse or a pen tablet), and can be coupled via one or more network interfaces to a network 782.

Follow request receiving unit 732 may be configured to receive a follow request. After receiving the follow request, follow request receiving unit 732 enables cursor detecting module 734. Cursor detecting module 734 may be configured to detect whether the cursor is in a currently active window. Cursor coordinates acquiring module 736 may be configured to obtain coordinates of the cursor when the cursor is in the currently active window. Character width acquiring module 738 may be configured to determine the width of a character in an editing region in a currently active window where the cursor is located, when the cursor is in the currently active window. Predetermined distance defining module 740 may be configured to set a predetermined distance value to be equal to the width of the character. Follow coordinates calculating module 742 may be configured to calculate follow coordinates according to coordinates of the cursor and the predetermined distance value. Following module 744 may be configured to set the coordinates of the mouse pointer to be equal to the follow coordinates.

Embodiments of the present invention may be implemented on various universal or dedicated computer system environments or configurations. For example, such computer systems may include personal computers, server computers, handheld or portable devices, tablet-type devices, multiprocessor systems, microprocessor-based systems, set-top boxes, programmable electronic consumption devices, network PCs, minicomputers, mainframe computers, distributed computing environments including any of the above systems or devices, and the like.

Embodiments of the present invention may be described within the general context of computer-executable instructions executed by a computer, such as a program module. Generally, the program module includes a routine, a program, an object, an assembly, a data structure and the like for implementing particular tasks or achieving particular abstract data types. Embodiments of the present invention may also be implemented in distributed computing environments, in which tasks are performed by remote processing devices connected via a communication network. In the distributed computing environments, program modules may be located in local and remote computer storage media that may include a storage device.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for controlling a mouse pointer to automatically follow a cursor, comprising:

detecting, by a computing device, whether the cursor is in a currently active window displayed on a screen of the computing device; and in response to detecting that the cursor is in the currently active window, entering a state in which the mouse pointer automatically follows the cursor, by:
  obtaining coordinates of the cursor;
  calculating follow coordinates based on the coordinates of the cursor and a predetermined distance, by:
    determining an angle formed between a y-axis coordinate of the cursor and a hypothetical line connecting the cursor with a position of a mouse pointer, wherein a mouse pointer device controls the position of the mouse pointer, and wherein calculating the follow coordinates is further based on the angle;
  setting coordinates for the position of the mouse pointer to the follow coordinates; and
  in response to detecting any movement of the cursor:
    intercepting signals from the mouse pointer device;
    calculating updated follow coordinates based on current coordinates of the cursor and the predetermined distance; and
    updating the coordinates for the position of the mouse pointer to the updated follow coordinates, which causes the mouse pointer to be displayed on the screen of the computing device at the updated follow coordinates, and further causes the computing device to display on the screen and maintain the predetermined distance between the cursor and the mouse pointer.

2. The method of claim 1, wherein calculating the follow coordinates further comprises:
  determining a width of a character in an editing region where the cursor is located when the cursor is in the currently active window; and
  setting the predetermined distance to be the width of the character.

3. The method of claim 1, wherein calculating the follow coordinates further comprises:
  determining a circle that is centered on the coordinates of the cursor, and
  setting the follow coordinates to be a point on the circle.

4. The method of claim 1, wherein in response to detecting any movement of the cursor, the method further comprises:
  continually updating coordinates for the position of the mouse pointer to follow the cursor at a distance equal to the predetermined distance.

5. The method of claim 1, further comprising:
  displaying a configuration option to allow the user to enable the mouse pointer to follow the cursor; and
  receiving user input to enable the configuration option.

6. The method of claim 1, further comprising:
  maintaining the mouse pointer to the left of the cursor until receiving user input to stop following the cursor.

7. A computing system comprising:
  one or more processors;
  a memory; and
  a non-transitory computer-readable medium coupled to the one or more processors storing instructions stored that, when executed by the one or more processors, cause the computing system to perform a method for controlling a mouse pointer to automatically follow a cursor, comprising:
  detecting, by the computing system, whether the cursor is in a currently active window displayed on a screen of the computing system; and in response to detecting that the cursor is in the currently active window, entering a state in which the mouse pointer automatically follows the cursor, by:
  obtaining coordinates of the cursor;
  calculating follow coordinates based on the coordinates of the cursor and a predetermined distance, by:
    determining an angle formed between a y-axis coordinate of the cursor and a hypothetical line connecting the cursor with a position of a mouse pointer, wherein a mouse pointer device controls the position of the mouse pointer, and wherein calculating the follow coordinates is further based on the angle;
  setting coordinates for the position of the mouse pointer to the follow coordinates; and
  in response to detecting any movement of the cursor:
    intercepting signals from the mouse pointer device;
    calculating updated follow coordinates based on current coordinates of the cursor and the predetermined distance; and
    updating the coordinates for the position of the mouse pointer to the updated follow coordinates, which causes the mouse pointer to be displayed on the screen of the computing device at the updated follow coordinates, and further causes the computing device to display on the screen and maintain the predetermined distance between the cursor and the mouse pointer.

8. The system of claim 7, wherein calculating the follow coordinates further comprises:
  determining a width of a character in an editing region where the cursor is located when the cursor is in the currently active window; and
  setting the predetermined distance to be the width of the character.

9. The system of claim 7, wherein calculating the follow coordinates further comprises:
  determining a circle that is centered on the coordinates of the cursor, and
  setting the follow coordinates to be a point on the circle.

10. The system of claim 7, wherein in response to detecting any movement of the cursor, the method further comprises:
  continually updating coordinates for the position of the mouse pointer to follow the cursor at a distance equal to the predetermined distance.

11. The system of claim 7, wherein the method further comprises:
  displaying a configuration option to allow the user to enable the mouse pointer to follow the cursor; and
  receiving user input to enable the configuration option.

12. The system of claim 7, wherein the method further comprises:
  maintaining the mouse pointer to the left of the cursor until receiving user input to stop following the cursor.

13. A non-transitory computer-readable storage medium storing instructions that when executed by a computer cause the computer to perform a method for controlling a mouse pointer to automatically follow a cursor, the method comprising:
  detecting, by the computer, whether the cursor is in a currently active window displayed on a screen of the computer; and
  in response to detecting that the cursor is in the currently active window, entering a state in which the mouse pointer automatically follows the cursor, by:
    obtaining coordinates of the cursor;

calculating follow coordinates based on the coordinates of the cursor and a predetermined distance, by:
  determining an angle formed between a y-axis coordinate of the cursor and a hypothetical line connecting the cursor with a position of a mouse pointer, wherein a mouse pointer device controls the position of the mouse pointer, and wherein calculating the follow coordinates is further based on the angle;
setting coordinates for the position of the mouse pointer to the follow coordinates; and
in response to detecting any movement of the cursor:
  intercepting signals from the mouse pointer device;
  calculating updated follow coordinates based on current coordinates of the cursor and the predetermined distance; and
  updating the coordinates for the position of the mouse pointer to the updated follow coordinates, which causes the mouse pointer to be displayed on the screen of the computing device at the updated follow coordinates, and further causes the computing device to display on the screen and maintain the predetermined distance between the cursor and the mouse pointer.

14. The non-transitory computer-readable storage medium of claim 13, wherein calculating the follow coordinates further comprises:
  determining a width of a character in an editing region where the cursor is located when the cursor is in the currently active window; and
  setting the predetermined distance to be the width of the character.

15. The non-transitory computer-readable storage medium of claim 13, wherein calculating the follow coordinates further comprises:
  determining a circle that is centered on the coordinates of the cursor, and
  setting the follow coordinates to be a point on the circle.

16. The non-transitory computer-readable storage medium of claim 13, wherein in response to detecting any movement of the cursor, the method further comprises:
  continually updating coordinates for the position of the mouse pointer to follow the cursor at a distance equal to the predetermined distance.

17. The non-transitory computer-readable storage medium of claim 13, further comprising:
  displaying a configuration option to allow the user to enable the mouse pointer to follow the cursor; and
  receiving user input to enable the configuration option.

18. A method of controlling a mouse pointer displayed on a screen of a device, comprising:
  detecting the cursor in a currently active window displayed on the screen of the device;
  obtaining coordinates of the cursor; and
  resetting coordinates for a position of the mouse pointer to a predetermined position in the currently active window, by:
    determining an angle formed between a y-axis coordinate of the cursor and a hypothetical line connecting the cursor with a position of a mouse pointer, wherein a mouse pointer device controls the position of the mouse pointer, and wherein the predetermined position is based on the angle; and
  in response to detecting any movement of the cursor:
    intercepting signals from the mouse pointer device;
    calculating updated follow coordinates based on current coordinates of the cursor and the predetermined position; and
    updating the coordinates for the position of the mouse pointer to the updated follow coordinates, which causes the mouse pointer to be displayed on the screen of the device at the updated follow coordinates, and further causes the device to display on the screen and maintain the predetermined distance between the cursor and the mouse pointer.

19. The method of claim 18, wherein the predetermined position has coordinates.

20. The method of claim 19, wherein resetting the coordinates for the position of the mouse pointer includes setting the coordinates for the position of the mouse pointer to follow the coordinates of the cursor.

21. The method of claim 1, further comprising:
  in response to detecting that the cursor is no longer in the currently active window, exiting the state in which the mouse pointer automatically follows the cursor.

22. The method of claim 21, wherein exiting the state in which the mouse pointer automatically follows the cursor is further in response to detecting an action by a user of the computing device to regain control of the intercepted signals.

23. The method of claim 22, wherein the action of the user includes one or more of:
  pressing a first predetermined combination of keys on a keypad associated with the computing device;
  moving the mouse pointer device in a first predetermined pattern;
  inputting a predetermined combination of pressing a second predetermined combination of keys on the keypad and moving the mouse pointer device in a second predetermined pattern; and
  tracing a predetermined pattern on a touch panel associated with the computing device.

* * * * *